Patented Aug. 23, 1938

2,127,678

UNITED STATES PATENT OFFICE 2,127,678

CUPRIFEROUS AZO DYESTUFFS

Detlef Delfs and Rudolf Knoche, Leverkusen I. G.-Werk, Germany, assignors to General Aniline Works, Inc., New York, N. Y., a corporation of Delaware No Drawing. Application July 14, 1936, Serial No. 90,614. In Germany August 10, 1935

5 Claims. (Cl. 260—145)

The present invention relates to azo dyestuffs containing copper in a complex form, more particularly it relates to azo dyestuffs which may be represented by the general formula:

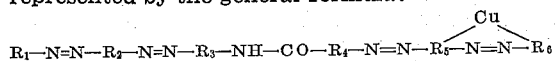

In the said general formula $R_1$ represents the radical of a diazotization component of the benzene or naphthalene series, $R_2$ stands for the radical of a middle-component of the benzene or naphthalene series, $R_3$ stands for the radical of a middle-component of the benzene series, $R_4$ stands for a radical of the benzene series, bearing the azo group in meta- or para-position to the carbonyl group, $R_5$ stands for the radical of a dihydroxy compound of the benzene or naphthalene series, bearing the azo groups in orthopositions to the hydroxy groups and $R_6$ stands for the radical of a diazotization compound suitable for yielding azo dyestuffs capable of forming metal complex compounds.

Suitable dihydroxy compounds of the benzene or naphthalene series capable of coupling twice are for instance 1,3-dihydroxy-benzene, 1,3-dihydroxybenzene-4-carboxylic acid, 2,6-dihydroxy-1-methyl-benzene, 1,6-dihydroxynaphthalene-3-sulfonic acid and 1,7-dihydroxynaphthalene-3-sulfonic acid and so on. As diazo compounds suitable for yielding azo dyestuffs capable of forming metal complex compounds there may be used the diazo compounds of o-aminohydroxy, o-aminoalkoxy, o-aminohalogen compounds and o-aminocarboxylic acids.

All components employed for the manufacture of the dyestuffs may contain substituents. In particular the dyestuffs may contain groups causing solubility, such as for instance sulfonic or carboxylic acid groups, which may suitably be present in the initial component $R_1$, the first middle component $R_2$ and/or in the diazo compound suitable for yielding azo dyestuffs which are capable of forming heavy metal complex compounds.

Our new dyestuffs may be built up in various manners. Thus, for instance, first the diazobenzoylamino disazo compound of the general formula:

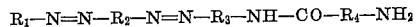

wherein $R_1$, $R_2$, $R_3$ and $R_4$ mean the same as stated above, may be combined with the dihydroxy compound capable of coupling twice and the product then coupled with the diazo compound suitable for yielding azo dyestuffs capable of forming heavy metal complex compounds, whereupon the formation of the copper complex may be effected, or the said diazo-benzoylamino disazo compound may be caused to react upon the already formed, and if desired, coppered monoazo dyestuff from the dihydroxy compound and the diazo compound, and then, if not previously carried out, the formation of the copper complex may be effected. The formation of complex compounds may also be effected in the dyeing bath or on the fiber.

The dyestuffs obtainable in accordance with the present process are soluble in water, predominantly with a brown color. Their dyeings on vegetable material possess good fastness to light and are unaffected by brightening.

The following examples illustrate the invention:

Example 1

702 parts by weight of the p-aminobenzoylamino disazo dyestuff having in its free state the following formula:

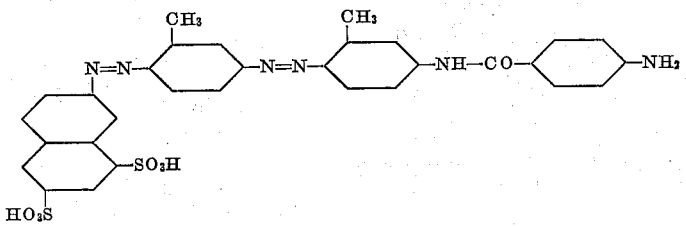

are dissolved in 28000 parts by weight of water and 69 parts by weight of sodium nitrite. This solution is added, while stirring well, to a mixture of 300 parts by weight of hydrochloric acid of 19.5° Bé. and ice water. After some time diazotization is complete. The suspension of the diazo compound is then added to a solution alkaline with sodium carbonate of 310 parts by weight of the monoazo dyestuff from 2-amino-1-hydroxybenzene-4-sulfonic acid and resorcin. After coupling is complete, the tetradisazo dyestuff formed is heated with a solution of 250 parts by weight of crystallized copper sulfate in 1500 parts by weight of water and 300 parts by weight of ammonia of 20% strength for about ½ hour at 80–85° C. Finally the dyestuff is salted out, isolated and dried as usual.

Example 2

768 parts by weight of the p-aminobenzoylamino disazo dyestuff of the formula:

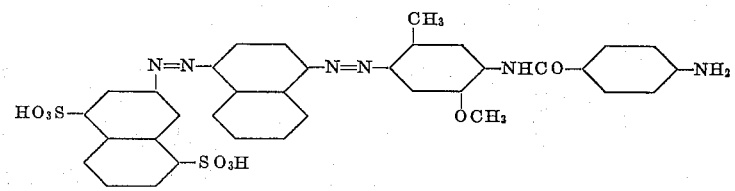

The dyestuff, having in its free state the following formula:

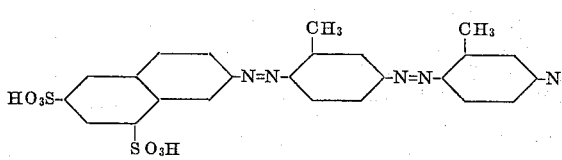

is a dark powder which dissolves in water with a brown coloration, in concentrated sulfuric acid with a violet coloration. The dyeings on cotton are of a beautiful yellowish brown, which is fast to light and unaffected by brightening. The dyestuff possesses the further property of dyeing equally mixed tissues of cotton and viscose.

Instead of coupling the diazotized p-aminobenzoyl-amino disazo dyestuff with the monoazo dyestuff from 2-amino-1-hydroxybenzene-4-sulfonic acid and resorcin and finally converting the same into the copper compound, the monoazo dyestuff described above may likewise be first converted into the copper compound, and then coupling may be effected. Coppering of the monoazo dyestuff or of the final dyestuff may also be effected according to the process of British Patent 296,819, when starting from the 1-methoxy-2-aminobenzene-4-sulfonic acid, or according to the process of U. S. Patent No. 1,957,580, when starting from the 2-chloro-1-aminobenzene-5-sulfonic acid.

Further the 1-hydroxy-2-aminobenzene-4-sulfonic acid of the example may likewise be replaced by other aminophenol sulfonic acids, such as for instance by 2-amino-4-nitrophenol-6-sulfonic acid or 2-amino-6-nitrophenol-4-sulfonic acid or chloro-o-aminophenol sulfonic acids or o-aminocresol sulfonic acids. Instead of o-aminophenol sulfonic acids likewise o-aminobenzoic acids may be employed.

Instead of combining the dihydroxy compound capable of coupling twice, such as for instance resorcin, first with the diazo compound, the diazotized p-aminobenzoylamino disazo dyestuff may first be combined with resorcin and the product then coupled with the diazo compound suitable for the copper complex formation, such as for instance 2-amino-1-methoxybenzene-4-sulfonic acid, and the dyestuff finally converted into the copper compound.

are diazotized as described in Example 1 and combined with the solution alkaline with sodium carbonate of 374 parts by weight of the monoazo dyestuff from 2-chloro-1-amino-benzene-5-sulfonic acid and 1.3 dihydroxy-benzene coppered according to U. S. Patent No. 1,957,580. When coupling is complete, the dyestuff is salted out and dried.

The dyestuff having in its free state the following formula:

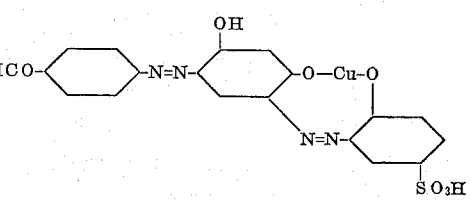

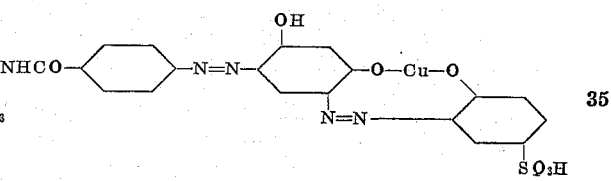

is a dark powder, which dissolves in water with a brown coloration. It dyes cotton brown shades, which are more red than those of the dyestuff of Example 1 and which are fast to light.

The aminobenzoyl compound of the above formula may also be replaced by the corresponding m-aminobenzoyl compound. Dyestuffs of similar properties are thus obtained.

Example 3

804 parts by weight of the aminobenzoylamino-disazo dyestuff of the following formula:

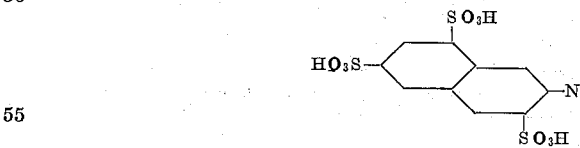

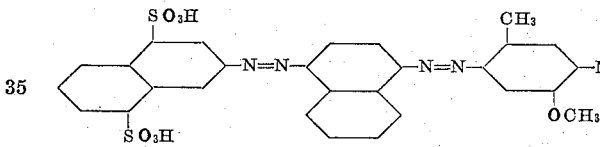

are dissolved in 20000 parts by weight of water, and 80 parts by weight of sodium nitrite are added. The solution is cooled with ice to 0–5° C. and acidified with 500 parts by weight of hydrochloric acid of 20° Bé. while stirring. After a little time the diazo compound is poured into the solution of 395 parts by weight of the monoazo dyestuff from diazotized 4-chloro-2-aminophenol and 1,6-dihydroxynaphthalene-3-sulfonic acid, the solution containing an excess of sodium carbonate. After coupling is complete the dyestuff is isolated. It is then converted into its copper compound in the usual manner. This copper compound is a dark powder, which easily dissolves in water with a brown coloration. Cellulose fibers are dyed in a bath containing Glauber's salt and sodium carbonate dark brown shades.

The dyestuff corresponds in its free state to the following formula:
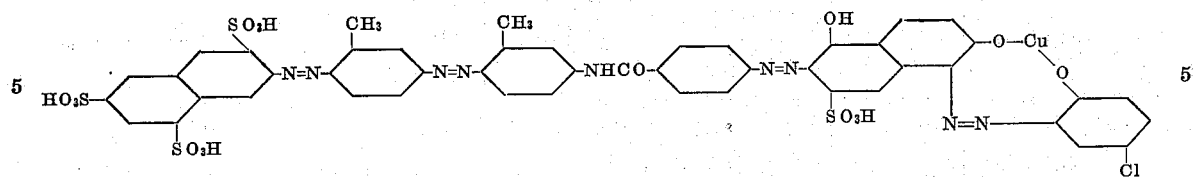
In the annexed table there are shown further dyestuffs prepared in accordance with the invention and the shades obtained therewith on cotton.

| Diazo compound of— | First middle component to be further diazotized | Second middle component to be aminoaroylated and further diazotized | Aminoaroylating agent | Final component the copper complex of the azo dyestuff from— | Shade |
|---|---|---|---|---|---|
| naphthalene-SO₃H, NH₂, SO₃H | CH₃-C₆H₄-NH₂ | CH₃-C₆H₄-NH₂ | ClCO-C₆H₄-NH₂ | OH-C₆H₃(SO₃H)-OH + H₂N-C₆H₃(OH)-NO₂ | Brown. |
| naphthalene-SO₃H, NH₂, SO₃H | CH₃-C₆H₄-NH₂ | CH₃-C₆H₄-NH₂ | ClCO-C₆H₄-NH₂ | OH(CH₃)-C₆H₂-OH + H₂N-C₆H₃(OH)-SO₃H | Do. |
| naphthalene-SO₃H, NH₂, SO₃H | CH₃-C₆H₄-NH₂ | C₆H₃(CH₃)-NH₂ | ClCO-C₆H₄-NH₂ | OH-C₆H₃-OH + H₂N-C₆H₃(OH)-SO₃H | Yellowish brown |
| naphthalene-SO₃H, NH₂, SO₃H | CH₃-C₆H₄-NH₂ | CH₃-C₆H₄-NH₂ | COCl-C₆H₄-NH₂ | OH-C₆H₃-OH + H₂N-C₆H₃(OH)-SO₃H | Do. |
| naphthalene-SO₃H, NH₂, SO₃H | CH₃-C₆H₄-NH₂ | CH₃-C₆H₄-NH₂ | ClCO-C₆H₃(NH₂)-OCH₃ | OH-C₆H₄-OH + H₂N-C₆H₃(OH)-SO₃H | Do. |
| naphthalene-SO₃H, NH₂, SO₃H | CH₃-C₆H₄-NH₂ | CH₃-C₆H₄-NH₂ | ClCO-C₆H₄-NH₂ | OH-C₆H₄-OH + H₂N-C₆H₃(OH)-SO₃H | Do. |
| naphthalene-SO₃H, NH₂, SO₃H | CH₃-C₆H₄-NH₂ | CH₃-C₆H₄-NH₂ | ClCO-C₆H₄-NH₂ | OH-C₆H₄-OH + H₂N-C₆H₃(OH)-SO₃H | Do. |
| naphthalene-SO₃H, NH₂, SO₃H | CH₃-C₆H₄-NH₂ | CH₃-C₆H₄-NH₂ | ClCO-C₆H₄-NH₂ | OH-C₆H₃(SO₃H)-OH + H₂N-C₆H₂(OH)(NO₂) | Do. |
| naphthalene-SO₃H, NH₂, SO₃H | CH₃-C₆H₄-NH₂ | CH₃-C₆H₄-NH₂ | ClCO-C₆H₄-NH₂ | OH-C₆H₄-OH + H₂N-C₆H₃(SO₃H)(COOH) | Orange. |
| naphthalene-SO₃H, NH₂, SO₃H | CH₃-C₆H₄-NH₂ | CH₃-C₆H₄-NH₂ | ClCO-C₆H₄-NH₂ | OH(CH₃)-C₆H₂-OH + H₂N-C₆H₃(OH)-SO₃H | Yellowish brown. |
| naphthalene-SO₃H, NH₂, HO₃S, SO₃H | CH₃-C₆H₄-NH₂ | CH₃-C₆H₄-NH₂ | ClCO-C₆H₄-NH₂ | OH-C₆H₄-OH + H₂N-C₆H₃(Cl)(OH) | Do. |
| naphthalene-OH, NH₂, HO₃S, SO₃H | CH₃-C₆H₄-NH₂ | CH₃-C₆H₄-NH₂ | ClCO-C₆H₄-NH₂ | OH-C₆H₄-OH + H₂N-C₆H₃(SO₃H)(OH) | Violetish brown. |

| Diazo compound of— | First middle component to be further diazotized | Second middle component to be aminoaroylated and further diazotized | Aminoaroylating agent | Final component the copper complex of the azo dyestuff from— | Shade |
|---|---|---|---|---|---|
| naphthalene-SO₃H, NH₂, SO₃H | benzene-OCH₃, NH₂, OCH₃ | toluene-CH₃, NH₂ | ClCO-C₆H₄-NH₂ | phenol-OH + H₂N-phenol-SO₃H, OH | Brown. |
| naphthalene-SO₃H, NH₂, SO₃H | benzene-OCH₃, NH₂, OCH₃ | toluene-CH₃, NH₂ | ClCO-C₆H₄-NH₂ | phenol-OH + H₂N-phenol-SO₃H, OH | Reddish brown. |
| naphthalene-SO₃H, NH₂, SO₃H | naphthalene-NH₂ | toluene-CH₃, NH₂ | ClCO-C₆H₄-NH₂ | phenol-OH + H₂N-phenol-SO₃H, OH | Do. |
| benzene-COOH, OH, NH₂, SO₃H | naphthalene-NH₂, SO₃H | toluene-CH₃, NH₂ | ClCO-C₆H₄-NH₂ | phenol-OH + H₂N-phenol-SO₃H, OH | Violetish brown. |
| benzene-OCH₃, NH₂, SO₃H | naphthalene-NH₂, SO₃H | toluene-CH₃, NH₂ | ClCO-C₆H₄-NH₂ | phenol-OH + H₂N-phenol-SO₃H, OH | Reddish brown. |
| benzene-CONH-COCH₃, SO₃H, NH₂ | naphthalene-NH₂, SO₃H | toluene-CH₃, NH₂ | ClCO-C₆H₄-NH₂ | phenol-OH + H₂N-phenol-SO₃H, OH | Do. |
| naphthalene-NH₂, SO₃H | naphthalene-NH₂, SO₃H | toluene-CH₃, NH₂ | ClCO-C₆H₄-NH₂ | phenol-OH + H₂N-phenol-SO₃H, OH | Do. |
| naphthalene-SO₃H, NH₂, SO₃H | benzene-NH₂ | toluene-CH₃, NH₂ | ClCO-C₆H₄-NH₂ | phenol-OH + H₂N-phenol-SO₃H, OH | Do. |
| naphthalene-SO₃H, NH₂, SO₃H | naphthalene-NH₂ | benzene-OCH₃, NH₂, CH₃ | ClCO-C₆H₄-NH₂ | phenol-OH + H₂N-phenol-SO₃H, OH | Do. |
| naphthalene-SO₃H, NH₂, SO₃H | naphthalene-NH₂ | benzene-OCH₃, NH₂, CH₃ | COCl-C₆H₄-NH₂ | phenol-OH + H₂N-phenol-SO₃H, OH | Do. |
| naphthalene-SO₃H, NH₂, SO₃H | naphthalene-NH₂, SO₃H | toluene-CH₃, NH₂ | ClCO-C₆H₄-NH₂ | phenol-OH + H₂N-benzene-COOH | Brown. |
| naphthalene-SO₃H, NH₂, SO₃H | naphthalene-NH₂, SO₃H | toluene-CH₃, NH₂ | ClCO-C₆H₄-NH₂ | phenol-OH + H₂N-phenol-Cl, OH | Reddish brown. |

| Diazo compound of— | First middle component to be further diazotized | Second middle component to be aminoroylated and further diazotized | Aminoaroylating agent | Final component the copper complex of the azo dyestuff from— | Shade |
|---|---|---|---|---|---|
| 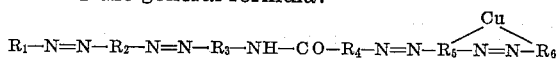 (row 1) | | | | | Do. |
| (see structures in image) | | | | | Do. |
| | | | | | Brown. |
| | | | | | Dark reddish brown. |
| | | | | | Do. |
| | | | | | Do. |

We claim:

1. Azo dyestuffs containing copper in a complex form of the general formula:

$$R_1-N=N-R_2-N=N-R_3-NH-CO-R_4-N=N-R_5\overset{Cu}{\diagup\diagdown}N=N-R_6$$

wherein $R_1$ represents a member selected from the group consisting of radicals of diazotization components of the benzene and naphthalene series, $R_2$ stands for a member selected from the group consisting of radicals of middle-components of the benzene and naphthalene series, $R_3$ stands for the radical of a middle component of the benzene series, $R_4$ stands for a radical of the benzene series, bearing the azo group in one of the positions meta and para to the carbonyl group, $R_5$ stands for a member selected from the group consisting of radicals of dihydroxy compounds of the benzene and naphthalene series, bearing the azo groups in ortho-positions to the hydroxy groups, and $R_6$ stands for the radical of a diazotization compound suitable for yielding azo dyestuffs capable of forming complex compounds, said azo dyestuffs yielding in general on vegetable fibers brown shades of good fastness to light.

2. Azo dyestuffs containing copper in a complex form of the general formula:

$$R_1-N=N-R_2-N=N-R_3-NH-CO-R_4-N=N-R_5\overset{Cu}{\diagup\diagdown}N=N-R_6$$

wherein $R_1$ represents a member selected from the group consisting of radicals of diazotization components of the benzene and naphthalene series, $R_2$ stands for a member selected from the group consisting of radicals of middle-components of the benzene and naphthalene series, $R_3$ stands for the radical of a middle component of the benzene series, $R_4$ stands for a radical of the benzene series, bearing the azo group in one of the positions meta and para to the carbonyl group, $R_5$ stands for the radical of resorcin, and $R_6$ stands for the radical of a diazotization compound suitable for yielding azo dyestuffs capable of forming complex compounds, said azo dyestuffs yielding in general on vegetable fibers brown shades of good fastness to light.

3. A dyestuff having in its free state the following formula:

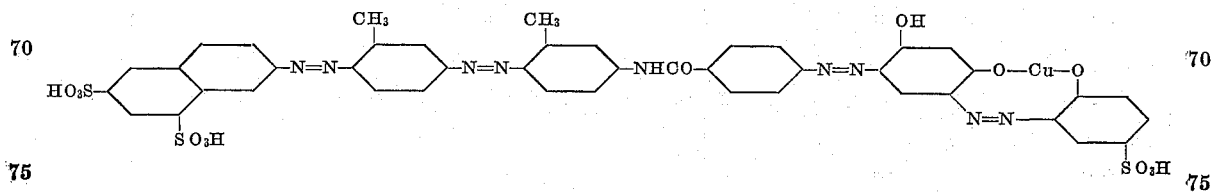

yielding on vegetable fibers yellowish-brown shades of good fastness to light.

4. A dyestuff having in its free state the following formula:

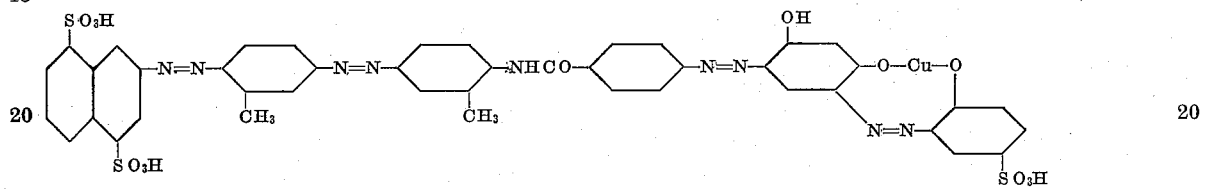

yielding on vegetable fibers yellowish-brown shades of good fastness to light.

5. Dyestuffs having in their free state the following general formula:

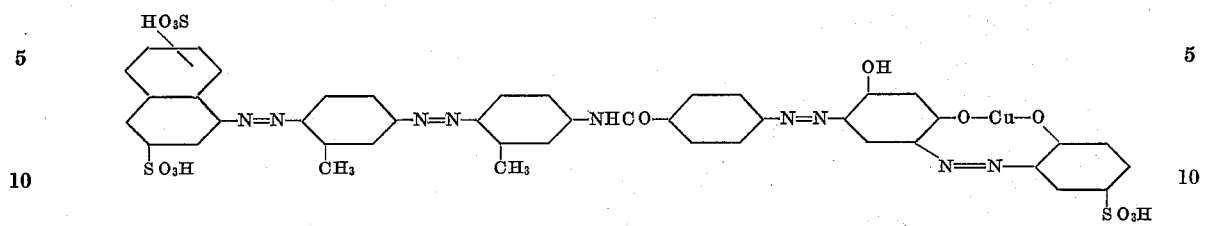

yielding on vegetable fibers yellowish-brown shades of good fastness to light.

DETLEF DELFS.
RUDOLF KNOCHE.